March 19, 1968 R. H. BOHMAN 3,373,577
AIR CONDITIONER CONTROL
Filed Sept. 6, 1966

INVENTOR.
Raymond H. Bohman
BY
Nicholas A. Camasto
ATTY.

United States Patent Office 3,373,577
Patented Mar. 19, 1968

3,373,577
AIR CONDITIONER CONTROL
Raymond H. Bohman, Galesburg, Ill., assignor to Admiral Corporation, Chicago, Ill., a corporation of Delaware
Filed Sept. 6, 1966, Ser. No. 577,418
3 Claims. (Cl. 62—180)

ABSTRACT OF THE DISCLOSURE

A thermostatic control system for an air conditioner which provides automatic operation of the unit throughout the entire air conditioning season. The control system controls turn-on and turn-off of the air circulating fan and of the refrigeration compressor responsive to the temperature of the air in the enclosure being conditioned.

---

This invention relates in general to air conditioning apparatus, and in particular to improved control means for automatically controlling the operation of an air conditioner throughout the entire air conditioning season. More particularly, this invention relates to window mounted air conditioners having a single control knob for adjusting a thermostatic switch device which individually controls energization of the refrigeration system, and of the fan, responsive to the air temperature of the area being cooled.

Conventionally, room type air conditioners such as those mounted on the sill of a window frame and having a condenser exposed to the outside atmosphere and an evaporator located within the area to be cooled, are equipped with extremely simple, and often inadequate, temperature controlling devices. These temperature controlling devices typically comprise a manually adjustable thermostat such as of the bimetallic element or expansion bellows type, which is arranged to only control energization of the motor driven compressor for operating the air conditioner refrigeration system.

Energization of the fan motor which provides air circulation through the finned evaporator coils, is usually controlled by a separate manual switch. Thus, the fan is either on or off, as the user desires, although the fan motor and compressor are preferably interconnected, thereby preventing compressor operation unless the fan motor is energized.

In these conventional units, when the air temperature of the room decreases to a predetermined level as the result of operating the compressor and fan, the thermostat only shuts off the compressor. Since the fan is generally not connected through the thermostat, it continues to operate circulating air through the evaporator and into the room, and usually drawing in a quantity of fresh air from the outside. This arrangement may be acceptable when the outside temperature and room heat load are relatively high, but as the outside temperature decreases, and the heat load in the room diminishes, it is obvious that operation of the fan motor is unnecessary. This unnecessary fan operation is costly and wasteful, both in electrical power consumed and in wear of the machinery.

Should the user be of a thrifty disposition, his attention would be required to manually turn off the fan motor each time the room temperature dropped below a comfortable level. Since this condition typically occurs at night when the outside temperature decreases, the attendant inconvenience can be readily imagined.

This invention eliminates the inconvenience and waste which existed in prior art air conditioning systems, by utilizing a two stage thermostatic control which is adjusted for the desired room temperature by a single control knob accessible from a front switch panel. The two stage thermostat not only controls operation of the motor driven compressor, but also controls energization of the fan motor. Consequently, as the room temperature decreases below a desired level, first the compressor is disconnected. A further temperature reduction disconnects the fan motor, thus completely disabling the air conditioning unit. Conversely, as the temperature increases, first the fan motor is connected and a subsequent temperature increase automatically turns on the compressor to cool the room. Thus the air conditioner need be adjusted only once at the beginning of the air conditioning season, and thereafter continues to operate automatically.

Accordingly, the primary object of this invention is to provide control means for an air conditioner, wherein said means is capable of successively disabling the refrigeration system and air circulation system responsive to a decrease in temperature in a conditioned area, and enabling said systems in reverse upon a subsequent temperature increase.

A further object of this invention is to provide control means for an air conditioning unit which is capable of substantially maintaining a given room temperature, and which automatically disables the entire unit when said room temperature decreases a predetermined number of degrees below the given temperature.

An advantage of this invention resides in a substantial savings in the operational costs of air conditioning units, and an operating convenience achieved by providing a control system which when once adjusted, does not require additional attention by the user.

Other objects and advantages of this invention will become apparent upon study of the following description taken in conjunction with the accompanying drawings wherein.

Figure 1:
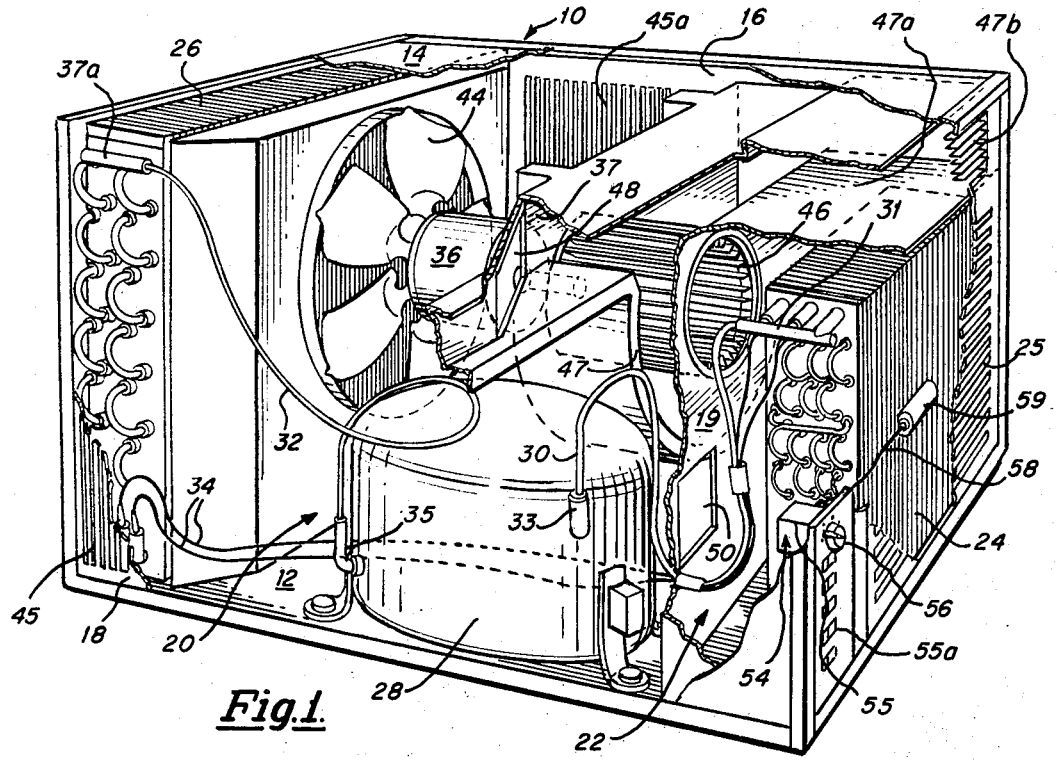
FIG. 1 is a cut-away, three dimensional view of a room type air conditioning unit incorporating the invention.

Turning to consideration of the drawings and in particular to FIG. 1, there is shown an air conditioner including a cabinet generally referred to by reference numeral 10, comprising a bottom 12, a top 14, and sides 16 and 18, for housing the air conditioning components. The cabinet is divided by a partition 19 into a machinery compartment 20 and an evaporator compartment 22. A vertically oriented finned evaporator 24 is located at the front of the evaporator compartment, and is concealed behind an adequately louvered decorative grill 25. The rear of the cabinet supports a finned refrigeration condenser 26 which is also vertically oriented. The refrigerant is compressed by a hermetically sealed motor driven compressor 28 located in the machinery compartment, and adequately secured to the bottom.

A low pressure, or suction line, 30 connects an outlet manifold 31 of the evaporator to an inlet 33 of the compressor. A high pressure line 32, delivers compressed refrigerant from compressor outlet 35 to an inlet 37a of the condenser, where it is cooled and condensed then conducted to the evaporator through a pair of small bore tubes 34, commonly called capillary tubes. The capillary tubes form the necessary flow restriction for operation of the refrigeration system. A section of each capillary tube is in physical contact with a part of the suction line for increased efficiency. Operation of the refrigeration system which includes the compression, liquification, expansion, and re-compression of the gaseous refrigerant, is wellknown by those familiar with the art, and need not be reiterated for purposes of this invention.

Machinery compartment 20 also contains a fan motor 36 having a rotating shaft extending from the front and rear thereof, not shown. The fan motor is secured to a fan support bracket 37 in any convenient manner, and the bracket is fastened to the cabinet sides. The rear shaft carries a propeller type fan blade 44 for drawing outside air through the condenser fins, and into the machinery compartment. This outside air circulates through the machinery compartment, assists in cooling the compressor and fan motor, and is exhausted through louvers 45 and 45a stamped in cabinet sides 18 and 16 respectively.

The front fan shaft extends through support bracket 37 and carries a squirrel cage type fan blade 46 on the end thereof. The fan blade is substantially surrounded by a circular housing 47 which is formed integral with the support bracket. Air circulated by the fan is drawn through the finned evaporator and expended into the room being cooled, through a front opening 47a partially concealed by adjustable louvers 47b.

Squirrel cage fan 46, also provides the required air pressure differentials for drawing outside fresh air into the room, and for exhausting air from the room being cooled or ventilated. Outside air enters the evaporator compartment from the machinery compartment, via port 50 through partition 19, and then is expended through front opening 47a into the room. Air which is exhausted from the room, such as unusually stale or smoke laddened air, passes through an exhaust port 48, into the machinery compartment, and out the louvers in sides 16 and 18. Movable dampers (not shown) controllable from the front, provide controls for opening and closing either port, thereby obtaining maximum flexibility in the operation of the unit to adapt to operating conditions.

A thermostat, generally referred to by reference numeral 54, is secured to the cabinet behind the front panel. It includes a body 55 located in a switch cluster 55a accessible from the front panel, a temperature adjusting knob 56, a liquid filled bellows 60 (shown in FIG. 2) and a liquid filled sensing tube 58 attached to a bulb 59, which is mounted in the air stream, forward of the evaporator. The bulb senses the temperature of the room air entering the evaporator, and actuates the movable bellows. Movement of the bellows actuates several switch contacts which are mechanically coupled thereto, in a manner to be explained below.

Figure 2:
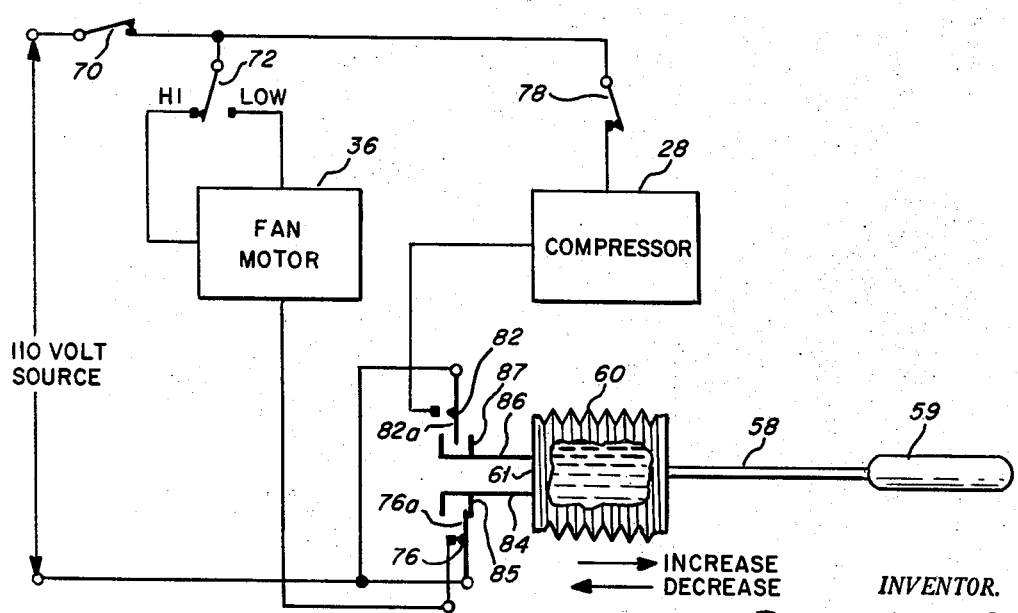
FIG. 2 is a schematic diagram of the electrical system of the air conditioning unit illustrated in FIG. 1. The schematic diagram also includes a mechanical representation of the two stage thermostat utilized therein.

Referring now to the schematic diagram of FIG. 2, a 110 volt source is shown, which may be supplied from a common household supply. The source is switchably connected to the electrical system of the air conditioning unit, through a single-pole on-off switch 70. Fan motor 36, represented by an appropriately labeled box, includes two fan motor windings for dual speed operation, thus providing a high speed for maximum cooling effect or maximum ventilation, and a low speed for quiet operation such as during the night. Energization of either the high speed or low speed winding is controlled by the user by a single-pole double throw switch 72, operable from the switch cluster 55a by a push button or other convenient switch mechanism. Thus, the fan is always connected in the circuit at either the high or low speed, and is only disconnected from the source by switch 70 when the unit is completely disconnected. This arrangement prevents the compressor 28 from being energized without the fan motor operating. The other side of the fan motor is connected to the source through a thermostatically operated switch 76 having a movable switch blade 76a actuated by the bellows in a manner to be explained in greater detail below.

The compressor 28 is represented by an appropriately labeled box, and power for its motor is initially controlled by the on-off switch 70. An additional switch 78 is connected in series with the compressor, after the fan motor, which allows the former to be disconnected when the user desires to operate the fan only, such as for ventilation. The other side of the compressor is connected to the source through a second thermostatically controlled switch 82 having a movable switch blade 82a actuated by the same thermostat bellows.

The thermostat, as partially described above, includes the liquid filled bellows 60 having a plate 61 which moves (horizontally in the diagrammatic representation) responsive to expansion of the liquid caused by a temperature change at the sensing bulb 59. A pair of arms 84 and 86, each having a pair of spaced apart fingers 85 and 87 straddling movable switch blades 76a and 82a, are connected to plate 61 for transmitting movement thereof to said switch blades. The lengths of the arms are adjusted so that as the temperature of the sensing bulb increases and the liquid expands, moving plate 61 to the left in FIG. 2, switch 76 will be the first to close, completing the circuit to the fan motor. A subsequent temperature increase moves the plate and arms further to the left, causing arm 86 to close switch 82, thereby energizing the compressor motor.

In the preferred embodiment, fingers 87 are adequately spaced apart for the bellows to open and close compressor switch 82 and cycle the compressor on and off, responsive to a 4° F. temperature change. Fingers 85 are also designed to open and close fan switch 76, responsive to a 4° F. temperature differential, but the difference between the mean operating temperature of the fan and compressor switches is 2° F., with the mean operating temperature of the compressor being higher than that of the fan. Thus when the temperature increases, the fan motor will always be energized before the compressor begins to operate. As the temperature decreases sufficiently, the compressor will be de-energized, followed by de-energization of the fan motor responsive to a further temperature decrease.

The desired room temperature may be increased or decreased by moving the entire thermostat bellows to the right or the left, respectively, by means which are not shown.

In operation, should the user desire the room temperature maintained at 72° F., he will close switches 70 and 78, and select a high or low fan speed with switch 72. The thermostat control knob is then set at a reference point and the compressor and fan motor will operate as follows. As the temperature rises to the desired 72° level, switch 76 closes, energizing the fan. A further temperature increase to approximately 74° causes switch 82 to close, energizing the compressor. If the unit is correctly sized for the area to be cooled, the compressor will cycle on and off at 74° and 70°, respectively. Should the room temperature drop lower than 70°, the fan continues to operate, but the compressor is turned off. When the room temperature reaches 68° F., the fan motor will also turn off, and the entire unit is disconnected.

What has been described is a control system for an air conditioner which need be adjusted only at the beginning of the air conditioning season. Thereafter, the control system will operate the compressor and fan automatically to maintain the desired room temperature, and will disconnect the entire unit when the temperature decreases a predetermined level below the desired temperature.

It is obvious that upon study by those skilled in the art, the disclosed invention may be altered or modified both in physical appearance and construction without departing from its inventive concept. Therefore, the scope of protection to be given this invention should not be limited by the embodiment described above, but should be determined by the essential descriptions thereof which appear in the appended claims.

The embodiments of the invention in which an exclusive property or privilege is claimed are defined as follows:

1. In combination with an air conditioning unit having a refrigeration system including a compressor and an evaporator and having a fan for circulating air from a conditioned area into heat exchange relationship with said evaporator, and back to said conditioned area: control means for automatically maintaining the temperature of said conditioned area substantially at a given level and for completely turning off said air conditioning unit when said temperature decreases below a second level, less than said given level; said control means comprising a manually adjustable thermostat having a temperature sensing bulb in heat transfer relationship with air from said conditioned area; said temperature sensing bulb indirectly imparting movement to two pairs of electrical contacts, said first pair of contacts controlling turn-on and turn-off of said fan, and said second pair of contacts controlling turn-on and turn-off of said compressor; said sensing bulb adapted to close said first pair of contacts upon the temperature of said conditioned area increasing to said given level, thus turning on said fan, and opening said contacts upon the temperature of said conditioned area decreasing to said second level, thus turning off said fan; said sensing bulb adapted to close said second pair of contacts, thus turning on said compressor and operating said refrigeration system, upon the air temperature of said conditioned area reaching a level greater than said given level, and opening said second pair of contacts upon said temperature decreasing to a level between said given level and said second level.

2. The combination as set forth in claim 1 wherein the mean of the turn-on and turn-off temperatures of said fan, as detected by said thermostat sensing bulb, is a constant number of degrees less than the mean of the turn-on and turn-off temperature of said compressor, and wherein the mean temperature differential is unaffected by the manual adjustment of said thermostat.

3. The combination as set forth in claim 2 wherein the mean of the turn-on and turn-off temperatures of said fan is substantially equal to the temperature at which said second pair of contacts open.

References Cited
UNITED STATES PATENTS

| | | | |
|---|---|---|---|
| 2,056,353 | 10/1936 | Harnz | 62—182 |
| 2,236,058 | 3/1941 | Henney | 62—180 |
| 2,975,611 | 3/1961 | Pietsch | 62—262 |
| 3,034,314 | 5/1962 | Canter | 62—180 |
| 3,070,972 | 1/1963 | Atchison | 62—180 |

WILLIAM J. WYE, *Primary Examiner.*